(12) United States Patent
Rusch et al.

(10) Patent No.: US 11,793,155 B2
(45) Date of Patent: Oct. 24, 2023

(54) CAT LITTER BOX SYSTEM

(71) Applicants: Kathy Rusch, Schenectady, NY (US); Vincent Rusch, Schenectady, NY (US)

(72) Inventors: Kathy Rusch, Schenectady, NY (US); Vincent Rusch, Schenectady, NY (US)

( * ) Notice: Subject to any disclaimer, the term of this patent is extended or adjusted under 35 U.S.C. 154(b) by 0 days.

(21) Appl. No.: 18/063,949

(22) Filed: Dec. 9, 2022

(65) Prior Publication Data

US 2023/0217889 A1 Jul. 13, 2023

Related U.S. Application Data (60) Provisional application No. 63/265,214, filed on Dec. 10, 2021.

(51) Int. Cl.
*A01K 1/01* (2006.01)

(52) U.S. Cl.
CPC .................... *A01K 1/0114* (2013.01)

(58) Field of Classification Search
CPC ..... A01K 1/011; A01K 1/0114; A01K 1/0107
See application file for complete search history.

(56) References Cited

U.S. PATENT DOCUMENTS

| | | | | |
|---|---|---|---|---|
| 4,522,150 | A * | 6/1985 | Gershman | A01K 1/0114 119/165 |
| 5,678,509 | A * | 10/1997 | Dillon | A01K 5/0114 119/501 |
| 5,785,000 | A * | 7/1998 | Barbary | A01K 1/0114 119/166 |
| 6,205,954 | B1 | 3/2001 | Bogaerts | |

(Continued)

FOREIGN PATENT DOCUMENTS

| | | |
|---|---|---|
| CN | 112955005 A | 6/2021 |
| JP | 2002000109 A | 1/2002 |

(Continued)

OTHER PUBLICATIONS

Simply Paws® Litter | Healthier For Cats, People & The Planet. Retrieved on Mar. 27, 2023 from the Internet URL: <https://www.simplypawsdesign.com/>, 9 pgs.

(Continued)

*Primary Examiner* — Monica L Perry
*Assistant Examiner* — Aaron M Rodziwicz
(74) *Attorney, Agent, or Firm* — Stephen P. Scuderi; Heslin Rothenberg Farley & Mesiti PC (57) ABSTRACT

A cat litter box system includes a sifter pan having a sifter pan floor with a plurality of thru holes therethrough. Sifter pan sidewalls surround and extend upwards from a perimeter of the sifter pan floor. A sifter pan rim is disposed on upper distal ends of the sifter pan sidewalls. The sifter pan rim extends laterally from the sifter pan sidewalls. A shield section includes shield section sidewalls having a lower rim portion configured to removably mount on an upper surface of the sifter pan rim. A front entryway is disposed in the shield section sidewalls. A plurality of removable sliding panels are stackable on top of one another within the front entryway. The sliding panels form an overspray barrier within the front entryway. The overspray barrier has an adjustable height based on the number of sliding panels stacked within the front entryway.

19 Claims, 8 Drawing Sheets

(56) References Cited

U.S. PATENT DOCUMENTS

| | | | |
|---|---|---|---|
| 6,474,262 B1* | 11/2002 | Ceccon | A01K 1/0114 119/166 |
| 7,131,396 B2 | 11/2006 | Matsuo et al. | |
| 7,380,519 B2 | 6/2008 | Ikegami et al. | |
| 7,568,448 B2 | 8/2009 | Yamamoto et al. | |
| 7,856,945 B2 | 12/2010 | Matsuo et al. | |
| 8,327,802 B2 | 12/2012 | Matsuo et al. | |
| 8,336,500 B1* | 12/2012 | Britt | A01K 1/0107 119/497 |
| 8,381,687 B2 | 2/2013 | Tsengas | |
| 10,076,098 B2 | 9/2018 | Matsuo et al. | |
| 10,111,402 B2 | 10/2018 | Takagi et al. | |
| RE47,347 E | 4/2019 | Thaler et al. | |
| 10,258,018 B2 | 4/2019 | Takagi et al. | |
| 10,701,893 B1* | 7/2020 | Neace | B07B 1/005 |
| 11,000,007 B2 | 5/2021 | Ward et al. | |
| 11,032,998 B2 | 6/2021 | Takagi et al. | |
| 2003/0217700 A1 | 11/2003 | Northrop et al. | |
| 2006/0156994 A1* | 7/2006 | Sage | A01K 1/0107 119/166 |
| 2009/0000556 A1* | 1/2009 | Matsuo | A01K 1/0107 119/161 |
| 2011/0000435 A1* | 1/2011 | Matsuo | A01K 1/0107 119/168 |
| 2013/0167777 A1* | 7/2013 | Sweetman | A01K 1/0107 119/165 |
| 2015/0020743 A1* | 1/2015 | Bauer | A01K 1/0107 119/166 |
| 2015/0173323 A1 | 6/2015 | Plazarte et al. | |
| 2017/0188539 A1 | 7/2017 | Orgias | |
| 2017/0223924 A1* | 8/2017 | Grul | A01K 1/0151 |
| 2019/0313595 A1* | 10/2019 | Remick | A01K 1/0114 |
| 2020/0163306 A1* | 5/2020 | Takai | A01K 1/0107 |
| 2020/0187450 A1* | 6/2020 | Van Wert | A01K 1/011 |
| 2020/0229392 A1 | 7/2020 | Takai et al. | |
| 2020/0323166 A1* | 10/2020 | Du | A01K 1/0107 |
| 2020/0390057 A1* | 12/2020 | Kiser | A01K 1/011 |
| 2021/0037781 A1* | 2/2021 | Klatt | A01K 1/0114 |
| 2021/0045348 A1* | 2/2021 | Takai | A01K 1/0114 |
| 2021/0051916 A1* | 2/2021 | Weber | A01K 1/0155 |
| 2022/0394949 A1* | 12/2022 | Howard | A01K 1/0114 |

FOREIGN PATENT DOCUMENTS

| | | | | |
|---|---|---|---|---|
| JP | | 2003116396 A | 4/2003 | |
| JP | | 2015159782 A | 9/2015 | |
| JP | | 6461645 B2 | 1/2019 | |
| JP | | 2020072751 A | 5/2020 | |
| JP | | 2020188696 A | 11/2020 | |
| JP | | 2020188748 A | 11/2020 | |
| WO | WO-2017008168 A1 * | | 1/2017 | A01K 1/0107 |

OTHER PUBLICATIONS

Dual Layer Cat Litter System With Superior Odour Control !. Retrieved on Mar. 27, 2023 from the Internet URL: <https://www.ezilockodour.com.au/>, 19 pgs.

Savic Nestor Cat Litter Tray Toilet Home (Grey). Retrieved on Mar. 27, 2023 from the Internet URL: <https://www.amazon.in/Savic-Nestor-Corner-Cat-Toilet/dp/B00Z9IP5FS>, 9 pgs.

* cited by examiner

CAT LITTER BOX SYSTEM

This application is a non-provisional of, and claims the benefit of the filing date of, U.S. provisional application 63/265,214, filed Dec. 10, 2021, entitled, "CAT LITTER BOX SYSTEM," the contents of which are incorporated herein by reference in their entirety.

FIELD

The present disclosure relates to cat litter box systems. More specifically, the disclosure relates to cat litter box systems having nested sections and/or height adjustable front entryways.

BACKGROUND

Cat (or pet) litter box systems are used by domestic pets, such as cats, to expel liquid and solid waste. However, sometimes cats spray their urine upward rather directly into the litter. This could be problematic if the litter box system does not provide adequate overspray barriers to such upwardly directed spray. Additionally, if the overspray barriers are made too high, then some cats, such as elderly cats or kittens, may have trouble entering the litter box system.

Additionally, current cat litter box systems often emit an undesirable odor if they are not properly cleaned. Yet cleaning such litter boxes can be difficult due to clumping and sticking of the wet litter.

Accordingly, there is a need for an improved cat litter box system that allows for easy entry into and out of the litter box, yet also provides a proper overspray barrier. There is also a need for a cat litter box system that is easily cleaned and emits less odor.

BRIEF DESCRIPTION

The present disclosure offers advantages and alternatives over the prior art by providing a cat litter box system that has a plurality of removable sliding panels that are stackable on top of one another within the front entryway. The sliding panels form an overspray barrier within the front entryway. The overspray barrier has an adjustable height based on the number of sliding panels stacked within the front entryway. Accordingly, the height of the overspray barrier can be adjusted to fit the physical characteristics of the cat or other pet. For example, an overspray barrier with a smaller height can be provided for elderly cats or kittens, while an overspray barrier with a larger height can be provided for young fully mature cats.

Additionally, the cat litter box system is designed to contain primarily pine pellets as cat litter. The pine pellets are a natural deodorant that absorb urine and break down into sawdust or pine dust (i.e., powderized pellets) when urinated on. The litter box system includes a sifter pan nested within a collection pan. The sifter pan has a floor with a grid of holes sized to let the pine powder pass through, but to prevent the solid pine pellets from passing through, to the collection pan. The collection pan can be removed for easy cleaning and removal of the powderized pellets.

Additionally, a shield section is disposed over the sifter pan and is removably latchable to either the sifter pan or both the sifter pan and collection pan. In addition to providing an enhanced overspray barrier, the shield section, sifter pan and collection pan can be lifted and shaken as a unit to facilitate the passage of the powderized pellets from the sifter pan into the collection pan for thorough and easy removal of the pine dust. Alternatively, the shield section and sifter pan can be lifted off of the collection pan as a unit to either shake the shield section and sifter pan as a unit or to enable easy access to the collection pan for cleaning of the powderized pellets.

A cat litter box system in accordance with one or more aspects of the present disclosure includes a sifter pan having a sifter pan floor with a plurality of thru holes therethrough. Sifter pan sidewalls surround and extend upwards from a perimeter of the sifter pan floor. A sifter pan rim is disposed on upper distal ends of the sifter pan sidewalls. The sifter pan rim extends laterally from the sifter pan sidewalls. A shield section includes shield section sidewalls having a lower rim portion configured to removably mount on an upper surface of the sifter pan rim. A front entryway is disposed in the shield section sidewalls. A plurality of removable sliding panels are stackable on top of one another within the front entryway. The sliding panels form an overspray barrier within the front entryway. The overspray barrier has an adjustable height based on the number of sliding panels stacked within the front entryway.

Another cat litter box system in accordance with one or more aspects of the present disclosure includes a sifter pan. The sifter pan includes a sifter pan floor having a plurality of thru holes therethrough. Sifter pan sidewalls extend upwards from a perimeter of the sifter pan floor. A sifter pan rim is disposed on upper distal ends of the sifter pan sidewalls. The sifter pan rim extends laterally from the sifter pan sidewalls. A shield section includes shield section sidewalls having a lower rim portion configured to removably mount on an upper surface of the sifter pan rim. A collection pan is disposed below the sifter pan. The collection pan is operable to catch powderized pellets as they pass through the plurality of thru holes in the sifter pan floor. A plurality of latches are disposed around the lower rim portion of the shield section. The latches are operable to removably latch onto the sifter pan rim to secure the shield section to the sifter pan to enable both the sifter pan and shield section to be lifted by the shield section off of the collection pan as a unit and shaken in order to facilitate the passage of powderized pellets through the sifter pan thru holes and into the collection pan.

Another cat litter box system in accordance with one or more aspects of the present disclosure includes a sifter pan. The sifter pan includes a sifter pan floor having a plurality of thru holes therethrough. Sifter pan sidewalls extend upwards from a perimeter of the sifter pan floor. A sifter pan rim is disposed on upper distal ends of the sifter pan sidewalls. The sifter pan rim extends laterally from the sifter pan sidewalls. A shield section includes shield section sidewalls having a lower rim portion configured to removably mount on an upper surface of the sifter pan rim. A front entryway is disposed in the shield section sidewalls. A plurality of removable sliding panels are stackable on top of one another within the front entryway. A collection pan is disposed below the sifter pan. The collection pan is operable to catch powderized pellets as they pass through the plurality of thru holes in the sifter pan floor.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
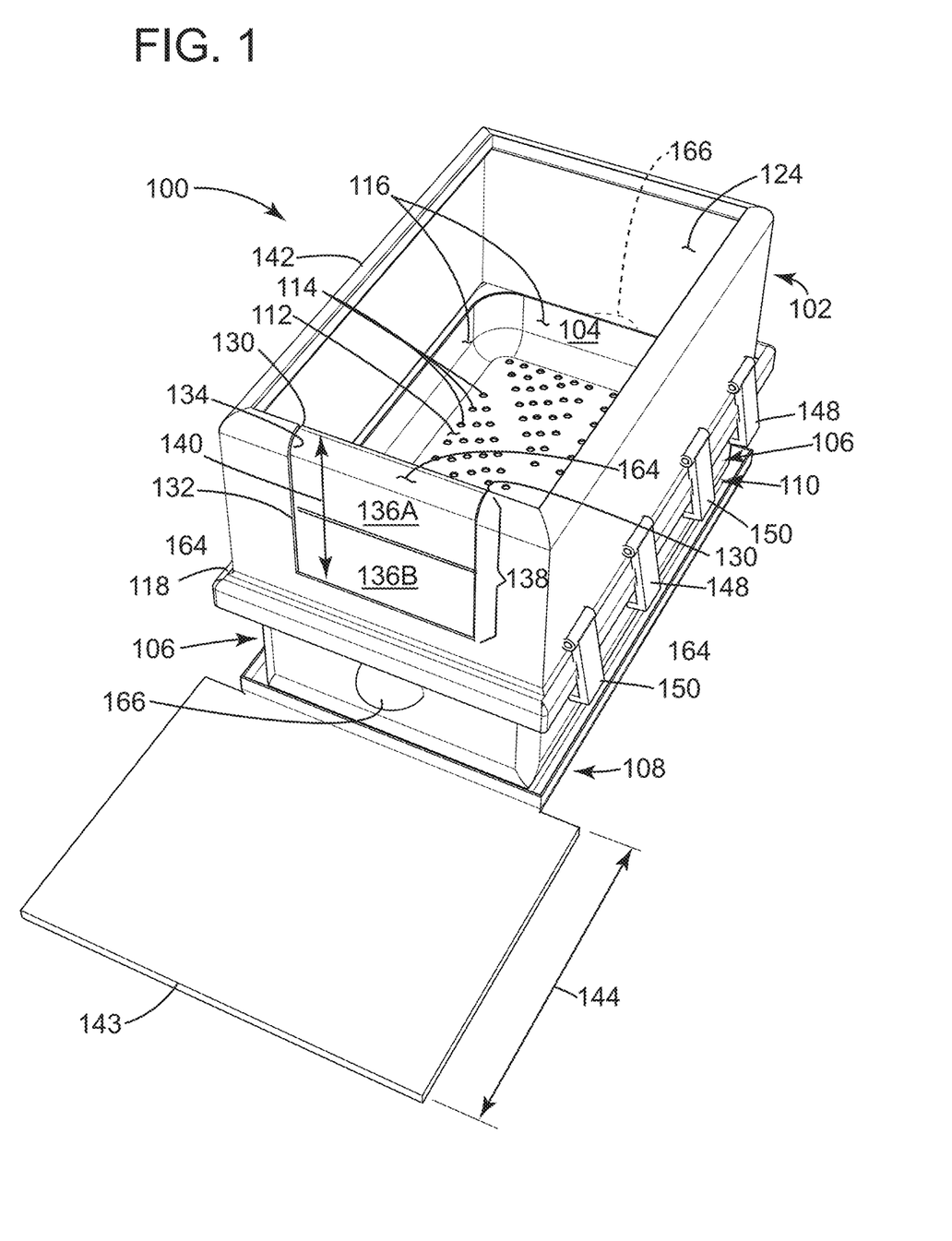
FIG. 1 depicts an example of a perspective top view of a cat litter box system, according to aspects described herein.
Figure 2:
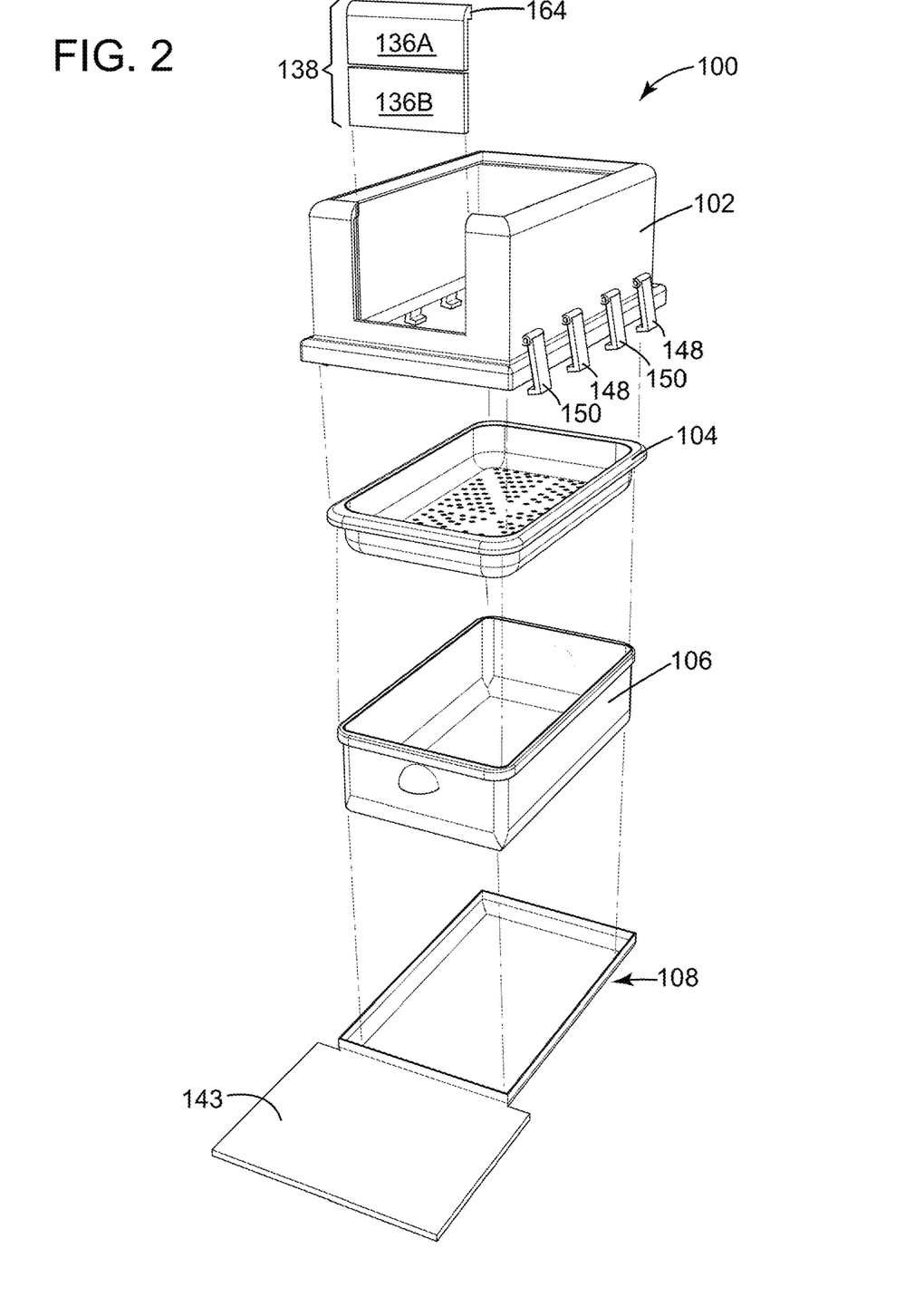
FIG. 2 depicts an example of an exploded perspective view of the cat litter box system of FIG. 1, according to aspects described herein.

Referring to FIGS. 1 and 2, an example is depicted of a perspective top view (FIG. 1) and an exploded view (FIG. 2) of a cat litter box system 100, according to aspects described herein. The cat litter box system includes a top shield section 102 disposed over a sifter pan 104. The sifter pan 104 is nested (recessed) within a collection pan 106. The collection pan 106 may be disposed over a tray section 108. A vibrating mechanism 110 may be attached to the collection pan 106 and at least a portion of the vibration mechanism 110 may be disposed between the collection pan 106 and the tray section 108.

The sifter pan 104 (see FIG. 5) includes a sifter pan floor 112 having a plurality of thru holes 114 extending therethrough. Sifter pan sidewalls 116 surround and extend upwards from a perimeter of the sifter pan floor 112. A sifter pan rim 118 is disposed on upper distal ends of the sifter pan sidewalls 116. The sifter pan rim 118 extends laterally from the sifter pan sidewalls 116.

Figure 5:
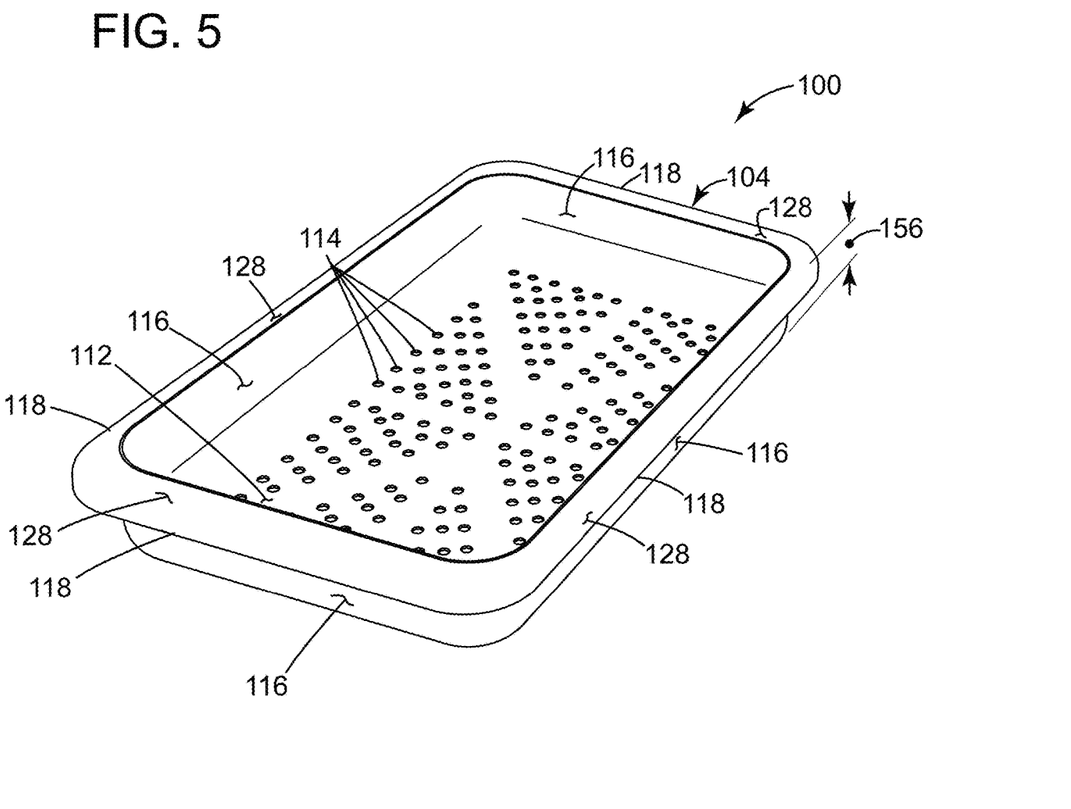
FIG. 5 depicts an example of a perspective top view of a sifter pan of the cat litter box system of FIG. 1, according to aspects described herein.

The sifter pan 104 is designed to contain primarily pine pellets 120, which are specifically designed as cat litter. Pine pellets are a natural deodorant that absorb urine from cats, or other pets, and break down into sawdust or pine dust (i.e., powderized pellets) when urinated on. The terms "powderized pellets" or "powderized pine pellets" as used herein, refers to the sawdust, pindust or other particulate that is formed or shed from pine pellets that have been urinated upon and broken down by the urine of a pet.

The thru holes 114 in the floor 112 of the sifter pan 104 have a diameter that is small enough to prevent pine pellets 120 (see FIGS. 3A, 3B and 3C) from passing through, but large enough to allow powderized pine pellets 122 (see FIGS. 3A-C) that are powderized by cat urine to pass through. The thru holes 114 in the floor 112 of the sifter pan 104 may have a diameter within a range of about 0.25 to 0.5 inches.

The shield section 102 includes shield section sidewalls 124 having a lower rim portion 126 (see FIGS. 3A-C) configured to removably mount on an upper surface 128 of the sifter pan rim 118. A front entryway 130 is disposed in a front portion of the shield section sidewalls 124.

The front entryway 130 includes a frame 132 (see FIG. 4) having grooves 134 disposed therein. The grooves 134 are configured to slidably receive a plurality of removable sliding panels 136 therein. The plurality of removable sliding panels 136 are stackable on top of one another within the front entryway 130.

Figure 4:
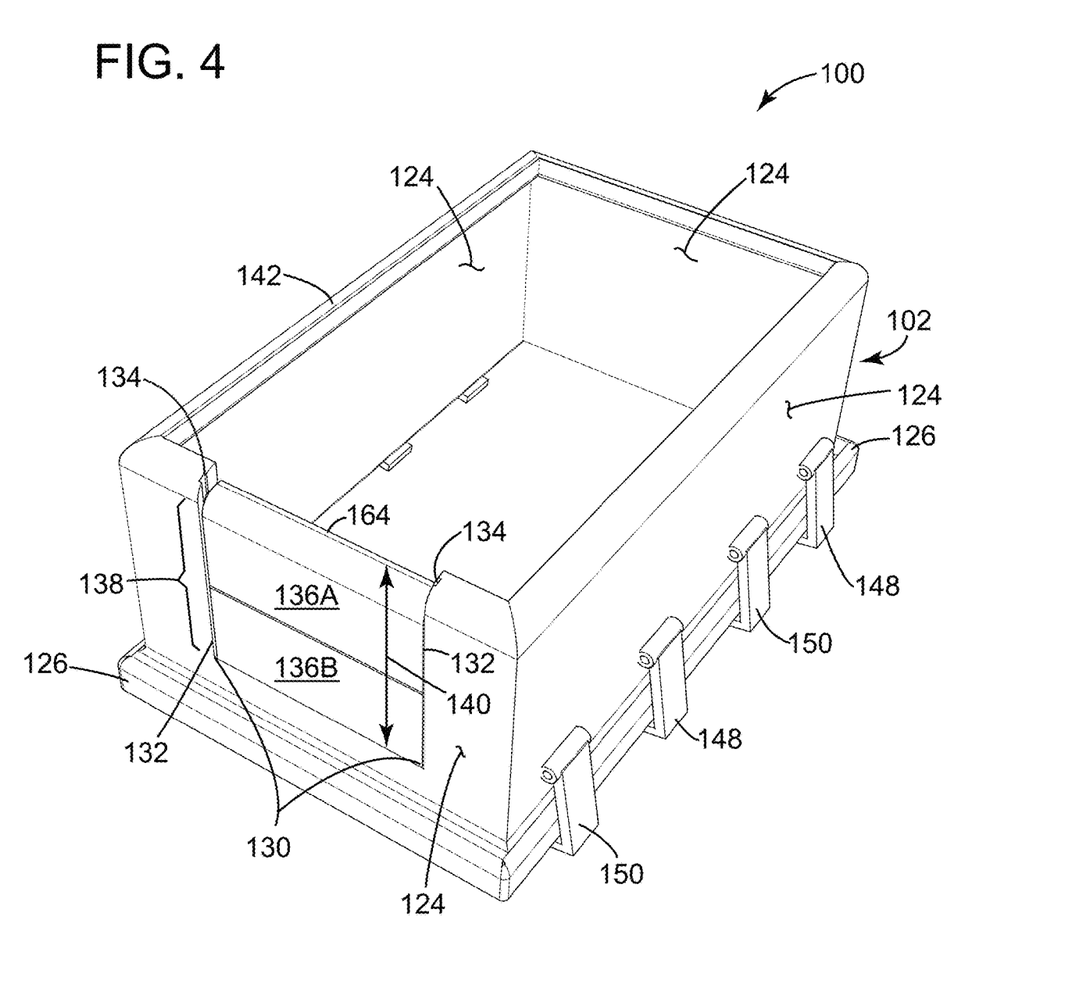
FIG. 4 depicts an example of a perspective top view of a shield section of the cat litter box system of FIG. 1, according to aspects described herein.

Advantageously, the sliding panels 136 form an adjustable overspray barrier 138 within the front entryway 130. The overspray barrier 138 has an adjustable height 140 that is based on the number of sliding panels 136 stacked within the front entryway 130. The height 140 of the overspray barrier can be conveniently adjusted to suit the physical characteristics of the cat (or other pet) that is using the cat litter box system 100. For example, the overspray barrier 138 may be composed of a single sliding panel 136 for a smaller height 140 to accommodate an elderly cat or a kitten. Alternatively, the overspray barrier 138 may be composed of two or more sliding panels 136 for a larger height 140 to accommodate a fully mature young cat (1-5 years old for example) that can easily clear the higher barrier 138. Therefore, the stackable sliding panels 136 provide an adjustable overspray barrier 138 that keeps urine spray in the cat litter box system 100 and simultaneously enables easy entrance into, and egress from, the system 100 for cats of all ages and physical conditions.

The shield section 102 may also include a shield section upper rim 142 disposed on an upper distal end portion of the shield section sidewalls 124. The shield section upper rim 142 may extend inwardly toward the interior of the shield section 102. The shield section upper rim 142 provides an inwardly extending barrier to overspray from a cat or other pet.

The cat litter box system 100 also includes the collection pan 106, which is disposed below the sifter pan 104. The collection pan 106 is designed to catch the powderized pellets 122 as they pass through the plurality of thru holes 114 in the sifter pan floor 112.

Additionally, the collection pan 106 may include indentations and/or handles 166 in the sidewalls 154 of the collection pan 106. As will be explained in greater detail herein, the indentations and/or handles 166 may be operable to facilitate lifting of the collection pan 106, sifter pan 104 and shield section 102 when the they are latched together via latches 150 (see FIGS. 3 and 4).

The cat litter box system 100 may also include the vibration mechanism 110, which may be disposed under the collection pan 106. The vibrating mechanism 110 may advantageously be operable to vibrate the collection pan 106 and the sifter pan 104 in order to facilitate the passage of the powderized pellets 120 through the sifter pan thru holes 114 and into the collection pan 106. The vibration mechanism 110 may included a motor and controls for inducing and adjusting the vibrations of the collection pan 106 and sifter pan 104.

The cat litter box system 100 may also include the tray section 108, which may be disposed under the collection pan 106. The tray section 108 may have a matt portion 143 that extends forward from the front entryway 130 a predetermined distance 144. The matt portion 143 is operable to catch the powderized pellets 122 that may be tracked by a cat as it exits the system 100.

Figure 3A:
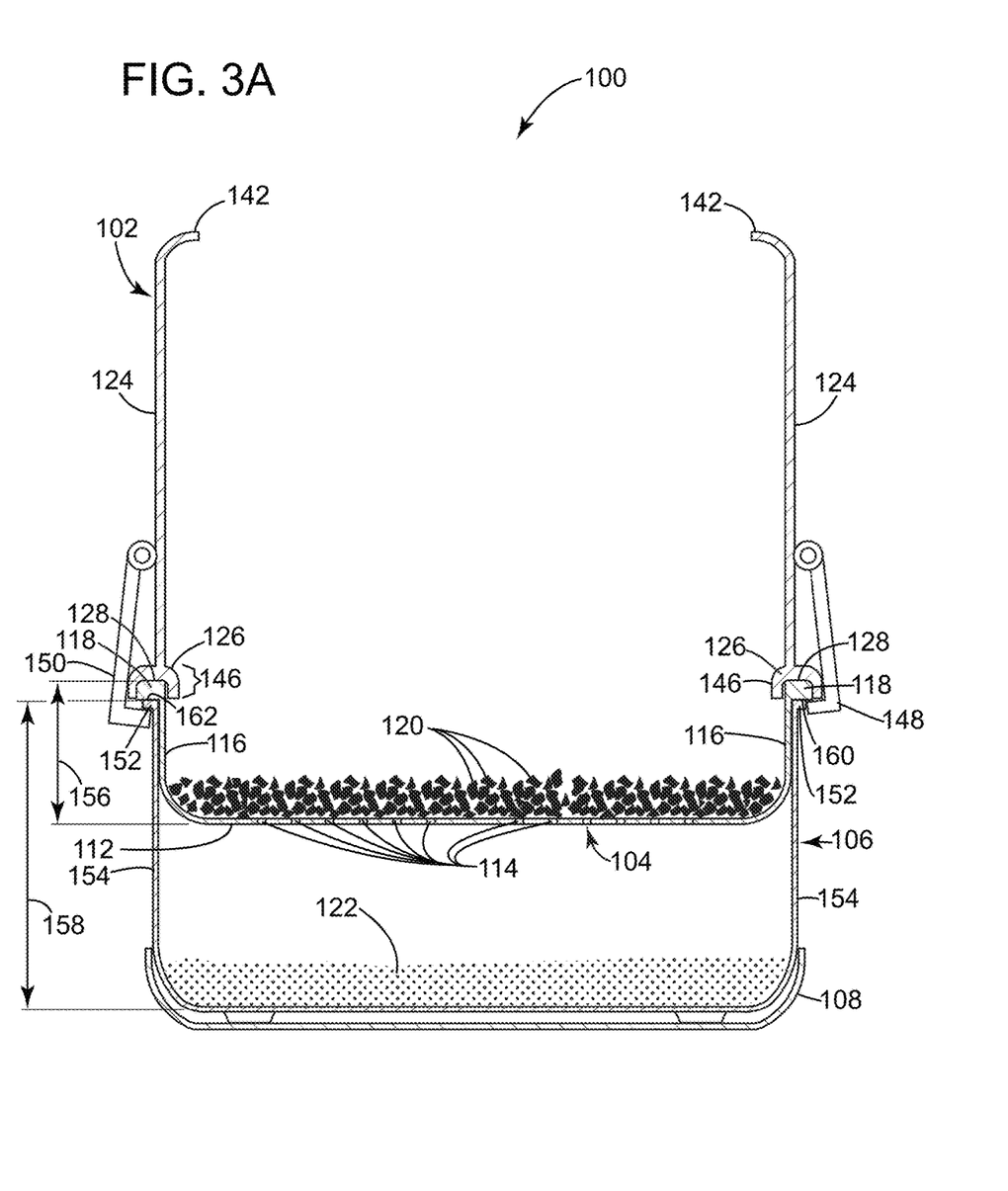
FIG. 3A depicts an example of side cross sectional view taken along the line 3-3 of the cat litter box system of FIG. 1, according to aspects described herein.
Figure 3B:
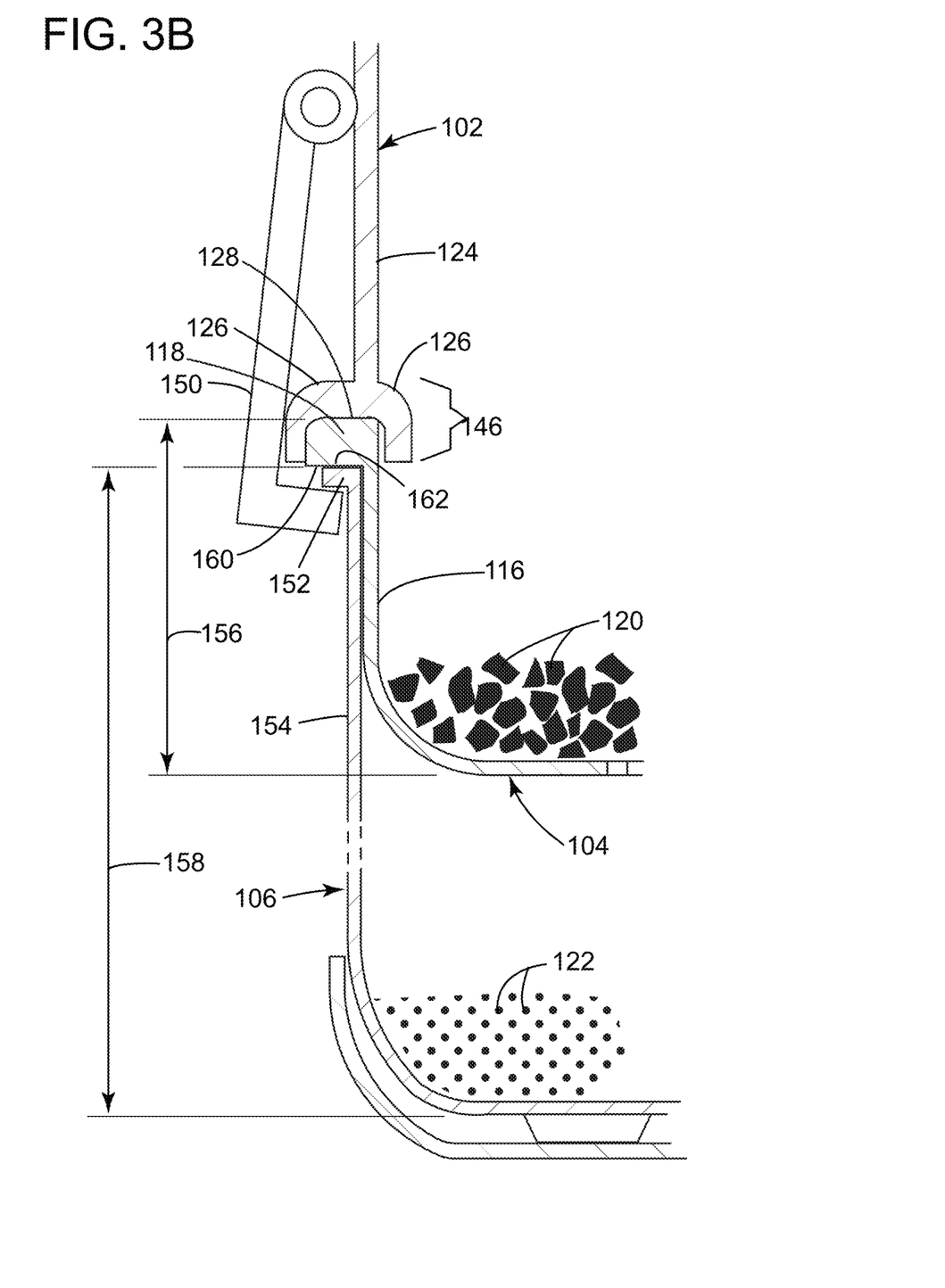
FIG. 3B depicts an example of an enlarged view of the left side of FIG. 3A.
Figure 3C:
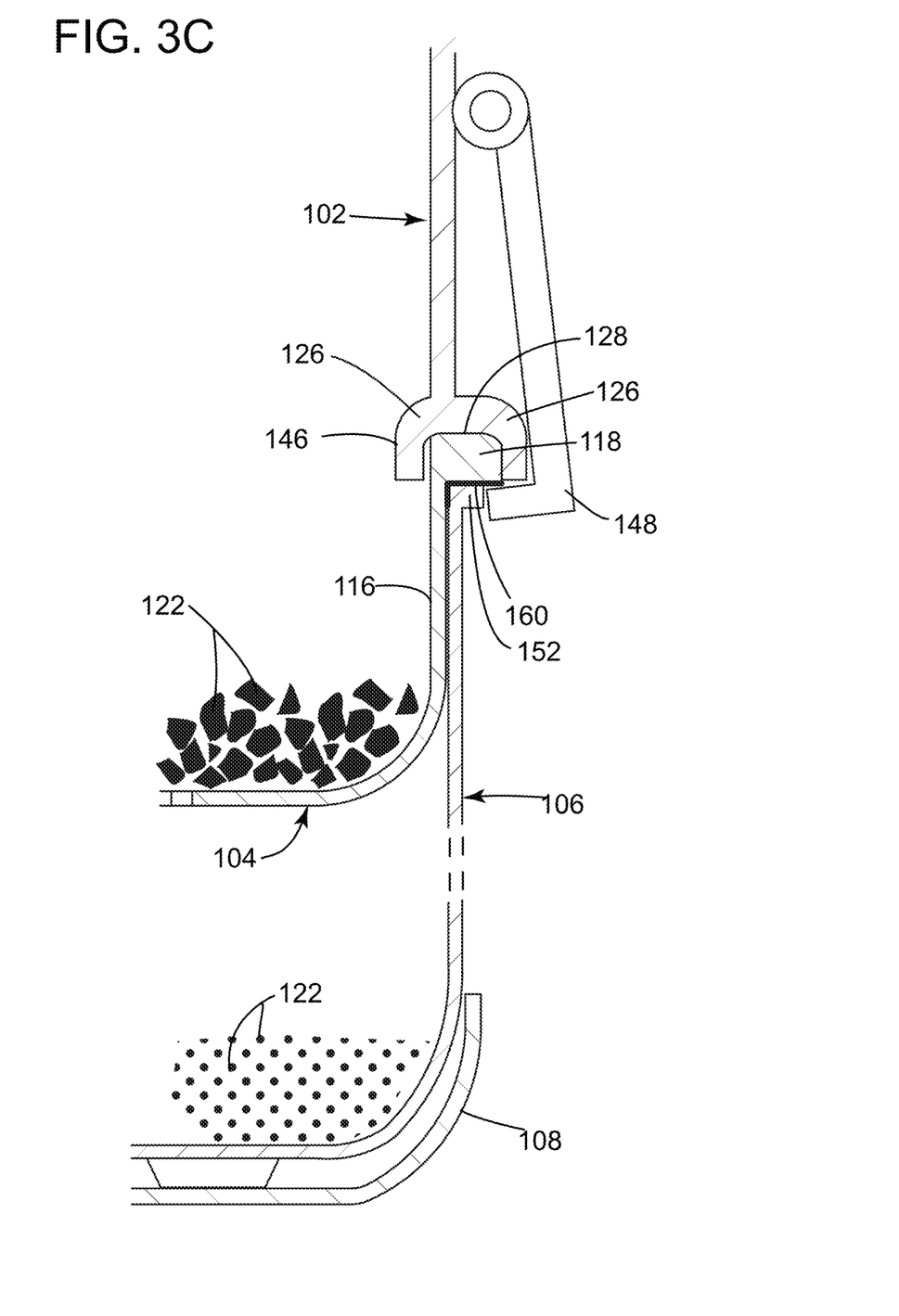
FIG. 3C depicts an example of an enlarged view of the right side of FIG. 3A.

Referring to FIGS. 3A, 3B and 3C, an example is depicted of a side cross sectional view (FIG. 3A) taken along the line 3-3 of the cat litter box system 100 of FIG. 1, an enlarged view (FIG. 3B) of the left hand side of FIG. 3A and an enlarged view (FIG. 3C) of the right hand side of FIG. 3A, according to aspects described herein. As illustrated in FIGS. 3A, 3B and 3C, the top shield section 102 is disposed over the sifter pan 104. The sifter pan 104 is nested (recessed) within the collection pan 106. The collection pan 106 may be disposed over the tray section 108. The vibrating mechanism 110 may optionally be attached to the collection pan 106 and at least a portion of the vibration mechanism 110 may be disposed between the collection pan 106 and the tray section 108.

The sifter pan 104 includes the sifter pan floor 112, which has a plurality of thru holes 114 extending therethrough. The sifter pan sidewalls 116 surround and extend upwards from the perimeter of the sifter pan floor 112. The sifter pan rim 118 is disposed on upper distal ends of the sifter pan sidewalls 116. The sifter pan rim 118 extends laterally from the sifter pan sidewalls 116.

The sifter pan 104 is designed to contain primarily pine pellets 120, which are specifically designed as cat litter. The thru holes 114 in the floor 112 of the sifter pan 104 have a diameter that is small enough to prevent pine pellets 120 from passing through, but large enough to allow powderized pine pellets 122 that are powderized by cat urine to pass through. The thru holes 114 in the floor 112 of the sifter pan 104 may have a diameter within a range of about 0.25 to 0.5 inches.

The shield section 102 may include the shield section upper rim 142, which is disposed on the upper distal end portion of the shield section sidewalls 124. The shield section upper rim 142 may extend inwardly toward the interior of the shield section 102. The shield section upper rim 142 provides an inwardly extending barrier to overspray from a cat or other pet.

The shield section 102 also includes the shield section sidewalls 124. The shield section sidewalls 124 include the lower rim portion 126, which is configured to removably mount on an upper surface 128 of the sifter pan rim 118. The lower rim portion 126 may also include an inwardly extending lip portion 146 that conforms to the inside surfaces of the sidewalls 116 of the sifter pan 104. The inwardly extending lip portion 146 of the shield section 102 is configured to slidably fit within the inside surfaces of the sidewalls 116 of the sifter pan 104 and to prevent lateral movement of the shield section 102 relative to the sifter pan 104 when the lower rim portion 126 of the shield section 102 is mounted on the upper surface 128 of the sifter pan rim 118.

Advantageously, a plurality of latches 148 (see FIG. 4) may be disposed around the lower rim portion 126 of the shield section 102. The latches 148 are operable to removably latch onto the sifter pan rim 118 to secure the shield section 102 to the sifter pan 104. Once secured by the latches 148, both the sifter pan 104 and shield section 102 are operable to be lifted by initially grabbing the shield section 102 and then pulling both the shield section 102 and sifter pan 104 off of the collection pan 106 as a unit. The latched shield section 102 is secured strongly enough to the sifter pan 104 to enable the sifter pan 104 and shield section 102 to be shaken as a unit, in order to facilitate the passage of the powderized pellets 122 through the sifter pan thru holes 114 and into the collection pan 106. Alternatively, the latched shield section 102 and sifter pan 104 may be lifted off of the collection pan 106 as a unit to enable convenient cleaning and removal of the powderized pellets 122 from the collection pan 108.

The collection pan 106 may include a collection pan rim 152 disposed on upper distal ends of sidewalls 154 of the collection pan 106. The sifter pan 104 may have a height 156 that is smaller than a height 158 of the collection pan 106. Additionally the sifter pan 104 may have an outer perimeter that fits within an inner perimeter of the collection pan 106. Accordingly, the sifter pan 104 may then be configured to recess (nest) into the collection pan 106 until a lower surface 160 of the sifter pan rim 118 rests upon an upper surface 162 of the collection pan rim 152.

Also advantageously, a second plurality of latches 150 may be disposed around the lower rim portion 126 of the shield section 102. The latches 150 may be operable to removably latch onto both the sifter pan rim 118 and the collection pan rim 152 to secure the shield section 102 to both the sifter pan 104 and the collection pan 106 to enable the sifter pan 104, the collection pan 106 and the shield section 102 to be lifted as a unit and shaken in order to facilitate the passage of the powderized pellets through the sifter pan thru holes 114 and into the collection pan 106.

Referring to FIG. 4, an example is depicted of a perspective top view of the shield section 102 of the cat litter box system 100 of FIG. 1, according to aspects described herein. As discussed earlier, the shield section 102 includes the shield section sidewalls 124 that have a lower rim portion 126 configured to removably mount on the upper surface 128 of the sifter pan rim 118 (see FIGS. 3A-C). The front entryway 130 is disposed in the front portion of the shield section sidewalls 124.

The front entryway 130 includes the frame 132, which has grooves 134 disposed therein. The grooves 134 are configured to slidably receive the plurality of removable sliding panels 136 therein. The plurality of removable sliding panels 136 are stackable on top of one another within the front entryway 130.

Advantageously, the sliding panels 136 form the adjustable overspray barrier 138 within the front entryway 130. The overspray barrier 138 has an adjustable height 140 that is based on the number of sliding panels 136 stacked within the front entryway 130. The height 140 of the overspray barrier can be conveniently adjusted to suit the physical characteristics of the cat (or other pet) that is using the cat litter box system 100. For example, the overspray barrier 138 may be composed of a single sliding panel 136 for a smaller height 140 to accommodate an elderly cat or a kitten. Alternatively, the overspray barrier 138 may be composed of two or more sliding panels 136 for a larger height 140 to accommodate a fully mature young cat (1-5 years old for example) that can easily clear the higher barrier 138. Therefore, the stackable sliding panels 136 provide an adjustable overspray barrier 138 that keeps urine spray in the cat litter box system 100 and simultaneously enables easy entrance into, and egress from, the system 100 for cats of all ages and physical conditions.

The shield section 102 may also include the shield section upper rim 142 disposed on the upper distal end portions of the shield section sidewalls 124. The shield section upper rim 142 may extend inwardly toward the interior of the shield section 102. The shield section upper rim 142 provides an additional inwardly extending barrier to overspray from a cat or other pet.

Additionally, a top panel 136A of the plurality of removable sliding panels 136 stacked within the front entryway 130 may include an top panel lip 164 disposed on an upper distal end portion of the top panel 136. The top panel lip 164 may extend inwardly toward the interior of the shield section 102. Much like the shield section upper rim 142, the top panel lip 164 may provide an additional inwardly extending barrier to overspray from a cat or other pet.

Referring to FIG. 5, and example is depicted of a perspective top view of the sifter pan 104 of the cat litter box system 100 of FIG. 1, according to aspects described herein. As discussed earlier, the sifter pan 104 104 includes the sifter pan floor 112, which has the plurality of thru holes 114 extending therethrough. The sifter pan sidewalls 116 surround and extend upwards from a perimeter of the sifter pan floor 112. The sifter pan rim 118 is disposed on upper distal ends of the sifter pan sidewalls 116. The sifter pan rim 118 extends laterally from the sifter pan sidewalls 116 and includes an upper surface 128 and a lower surface 160 (see FIGS. 3A-C). The sifter pan has a height 156 that is less than the height 158 of the collection pan 106.

The thru holes 114 in the floor 112 of the sifter pan 104 have a diameter that is small enough to prevent pine pellets 120 (see FIGS. 3A-C) from passing through, but large enough to allow powderized pine pellets 122 (see FIGS. 3A-C) that are powderized by cat urine to pass through. The thru holes 114 in the floor 112 of the sifter pan 104 may have a diameter within a range of about 0.25 to 0.5 inches.

Figure 6:
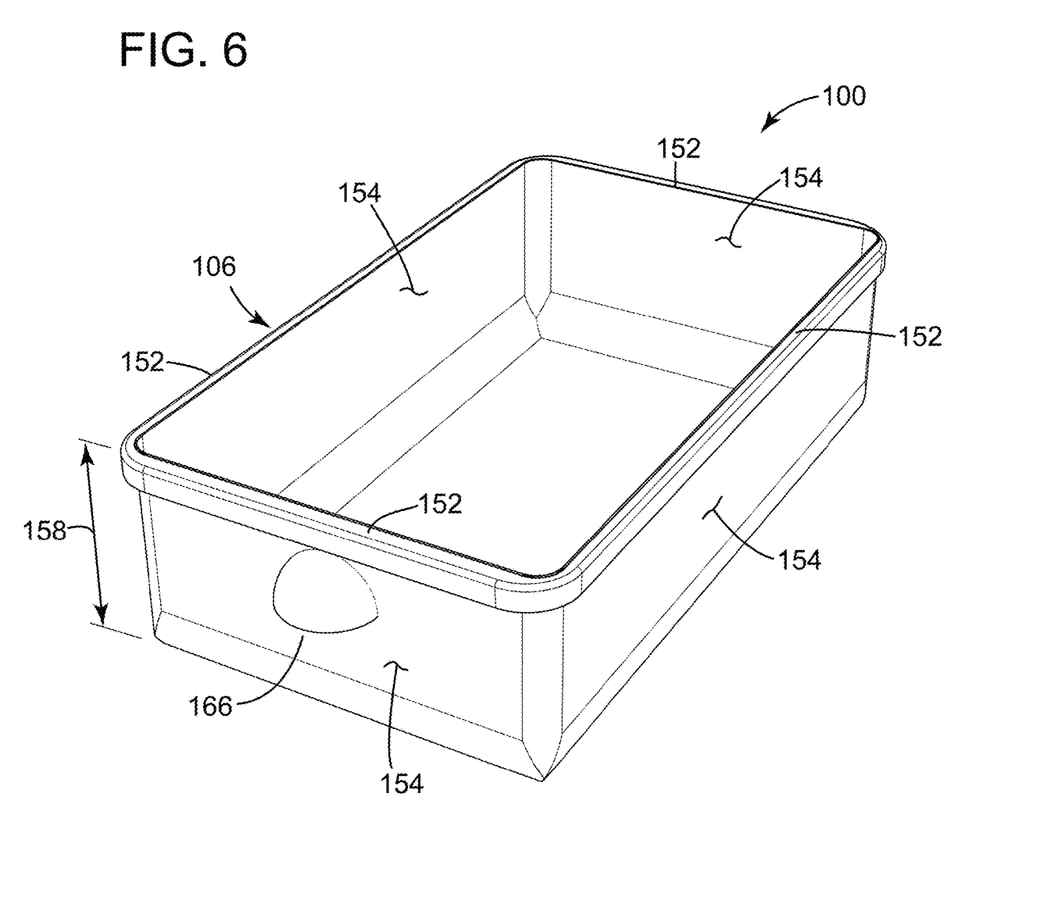
FIG. 6 depicts an example of a perspective top view of a collection pan of the cat litter box system of FIG. 1, according to aspects described herein.

Referring to FIG. 6, an example is depicted of a perspective top view of a collection pan 106 of the cat litter box system 100 of FIG. 1, according to aspects described herein. As discussed earlier, the collection pan 106 is designed to catch the powderized pellets 122 as they pass through the plurality of thru holes 114 in the sifter pan floor 112 (see FIGS. 3A-C).

The collection pan 106 may include a collection pan rim 152 disposed on upper distal ends of sidewalls 154 of the collection pan 106. The collection pan 106 may have a height 158 that is larger than the height 156 of the sifter pan 104. The collection pan 106 may have a perimeter that is larger than a perimeter of the sifter pan. Accordingly, the sifter pan 104 may be nested (recessed) within the collection pan 106. The collection pan 106 may be disposed over the tray section 108.

Additionally, the collection pan 106 may include indentations and/or handles 166 in the sidewalls 154 of the collection pan 106. The indentations and/or handles 166 may be operable to facilitate lifting of the collection pan 106, sifter pan 104 and shield section 102 when the they are latched together via latches 150 (see FIGS. 3 and 4).

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A cat litter box system comprising:
   a sifter pan comprising:
      a sifter pan floor having a plurality of thru holes therethrough,
      sifter pan sidewalls surrounding and extending upwards from a perimeter of the sifter pan floor, and
      a sifter pan rim disposed on upper distal ends of the sifter pan sidewalls, the sifter pan rim extending laterally from the sifter pan sidewalls; and
   a shield section comprising:
      shield section sidewalls having a lower rim portion configured to removably mount on an upper surface of the sifter pan rim,
      a front entryway disposed in the shield section sidewalls, the front entry way including a frame having grooves disposed within the frame of the front entry way,
      a plurality of sliding panels that are removable from the front entry way, the sliding panels being configured to stack and abut on top of one another within the grooves of the frame of the front entryway;
   wherein the sliding panels form a solid overspray barrier within the front entryway, the overspray barrier having at least three adjustable heights based on the number of sliding panels stacked and abutted within the front entryway.

2. The cat litter box system of claim 1, comprising:
   a collection pan disposed below the sifter pan, the collection pan operable to catch powderized pellets as the powderized pellets pass through the plurality of thru holes in the sifter pan floor.

3. The cat litter box system of claim 2, comprising:
   a plurality latches disposed around the lower rim portion of the shield section, the latches operable to removably latch onto the sifter pan rim to secure the shield section to the sifter pan to enable both the sifter pan and shield section to be lifted by the shield section off of the collection pan as a unit and shaken in order to facilitate the passage of the powderized pellets through the sifter pan thru holes and into the collection pan.

4. The cat litter box system of claim 2, comprising:
   a vibrating mechanism disposed under the collection pan, the vibrating mechanism operable to vibrate the collection pan and the sifter pan in order to facilitate the passage of the powderized pellets through the sifter pan thru holes and into the collection pan.

5. The cat litter box system of claim 2, comprising:
   a tray section disposed under the collection pan, the tray section having a matt portion that extends forward from the front entryway a predetermined distance, the matt portion operable to catch the powderized pellets that are tracked by a cat as the cat exits the system.

6. The cat litter box system of claim 2, comprising:
the collection pan comprising a collection pan rim disposed on upper distal ends of sidewalls of the collection pan;
the sifter pan having a height that is smaller than a height of the collection pan; and
the sifter pan having an outer perimeter that fits within an inner perimeter of the collection pan;
wherein, the sifter pan is configured to recess into the collection pan until a lower surface of the sifter pan rim rests upon an upper surface of the collection pan rim.

7. The cat litter box system of claim 6, comprising:
a plurality latches disposed around the lower rim portion of the shield section, the latches operable to removably latch onto the sifter pan rim and the collection pan rim to secure the shield section to both the sifter pan and the collection pan to enable the sifter pan, the collection pan and the shield section to be lifted as a unit and shaken in order to facilitate the passage of the powderized pellets through the sifter pan thru holes and into the collection pan.

8. The cat litter box system of claim 1, comprising:
the top panel of the plurality of removable sliding panels stacked within the front entryway comprising a panel lip disposed on an upper distal end portion of the top panel, the panel lip extending inwardly toward the interior of the shield section, the panel lip providing an inwardly extending barrier to overspray from a cat.

9. The cat litter system of claim 1, comprising:
the shield section comprising a shield section upper rim disposed on an upper distal end portion of the shield section sidewalls, the shield section upper rim extending inwardly toward the interior of the shield section, the shield section upper rim providing an inwardly extending barrier to overspray from a cat.

10. The cat litter box system of claim 1, comprising the thru holes in the floor of the sifter pan having a diameter within a range of 0.25 to 0.5 inches.

11. The cat litter box system of claim 1, comprising the thru holes in the floor of the sifter pan having a diameter that is small enough to prevent pine pellets from passing through, but large enough to allow powderized pine pellets that are powderized by cat urine to pass through.

12. The cat litter box system of claim 1, wherein the at least three adjustable heights of the overspray barrier comprise:
a first adjustable height having no sliding panels stacked within the front entryway;
a second adjustable height having a first sliding panel stacked within the front entryway; and
a third adjustable height having a second sliding panel stacked on top of, and abutted against, the first sliding panel within the front entryway.

13. A cat litter box system comprising:
a sifter pan comprising:
a sifter pan floor having a plurality of thru holes therethrough,
sifter pan sidewalls extending upwards from a perimeter of the sifter pan floor, and
a sifter pan rim disposed on upper distal ends of the sifter pan sidewalls, the sifter pan rim extending laterally from the sifter pan sidewalls;
a shield section comprising,
shield section sidewalls having a lower rim portion configured to removably mount on an upper surface of the sifter pan rim,
a front entryway disposed in the shield section sidewalls, the front entry way including a frame having grooves disposed within the frame of the front entry way, and
a plurality of sliding panels that are removable from the front entry way, the sliding panels being configured to stack and abut on top of one another within the grooves of the frame of the front entryway, wherein the sliding panels form a solid overspray barrier within the front entryway, the overspray barrier having at least three adjustable heights based on the number of sliding panels stacked and abutted within the front entryway;
a collection pan disposed below the sifter pan, the collection pan comprising a collection pan rim disposed on upper distal ends of sidewalls of the collection pan, the collection pan operable to catch powderized pellets as the powderized pellets pass through the plurality of thru holes in the sifter pan floor; and
a plurality latches disposed around the lower rim portion of the shield section, the latches operable to removably latch onto the sifter pan rim and the collection pan rim to secure the shield section to both the sifter pan and the collection pan to enable both the sifter pan, the collection pan and shield section to be lifted as a unit and shaken in order to facilitate the passage of the powderized pellets through the sifter pan thru holes and into the collection pan.

14. The cat litter box system of claim 13, comprising:
the sifter pan having a height that is smaller than a height of the collection pan; and
the sifter pan having an outer perimeter that fits within an inner perimeter of the collection pan;
wherein, the sifter pan is configured to recess into the collection pan until a lower surface of the sifter pan rim rests upon an upper surface of the collection pan rim.

15. The cat litter box system of claim 13, wherein the at least three adjustable heights of the overspray barrier comprise:
a first adjustable height having no sliding panels stacked within the front entryway;
a second adjustable height having a first sliding panel stacked within the front entryway; and
a third adjustable height having a second sliding panel stacked on top of, and abutted against, the first sliding panel within the front entryway.

16. A cat litter box system comprising:
a sifter pan comprising:
a sifter pan floor having a plurality of thru holes therethrough,
sifter pan sidewalls extending upwards from a perimeter of the sifter pan floor, and
a sifter pan rim disposed on upper distal ends of the sifter pan sidewalls, the sifter pan rim extending laterally from the sifter pan sidewalls;
a shield section comprising:
shield section sidewalls having a lower rim portion configured to removably mount on an upper surface of the sifter pan rim,
a front entryway disposed in the shield section sidewalls, the front entry way including grooves disposed within the frame of the front entry way,
a plurality of sliding panels that are removable from the front entry way, the sliding panels being configured to stack and abut on top of one another within the grooves of the frame of the front entryway, wherein the sliding panels form a solid overspray barrier within the front entryway, the overspray barrier having at least three adjustable heights based on the number of sliding panels stacked and abutted within the front entryway; and a collection pan disposed below the sifter pan, the collection pan operable to catch powderized pellets as the powderized pellets pass through the plurality of thru holes in the sifter pan floor.

17. The cat litter box system of claim 16, comprising:

a plurality latches disposed around the lower rim portion of the shield section, the latches operable to removably latch onto the sifter pan rim to secure the shield section to the sifter pan to enable both the sifter pan and shield section to be lifted by the shield section off of the collection pan as a unit and shaken in order to facilitate the passage of the powderized pellets through the sifter pan thru holes and into the collection pan.

18. The cat litter box system of claim 16, comprising:

the collection pan comprising a collection pan rim disposed on upper distal ends of sidewalls of the collection pan;

the sifter pan having an outer perimeter that fits within an inner perimeter of the collection pan, wherein the sifter pan is configured to recess into the collection pan until a lower surface of the sifter pan rim rests upon an upper surface of the collection pan rim; and a plurality of latches disposed around the lower rim portion of the shield section, the latches operable to removably latch onto the sifter pan rim and the collection pan rim to secure the shield section to both the sifter pan and the collection pan to enable the sifter pan, the collection pan and the shield section to be lifted as a unit and shaken in order to facilitate the passage of the powderized pellets through the sifter pan thru holes and into the collection pan.

19. The cat litter box system of claim 16, wherein the at least three adjustable heights of the overspray barrier comprise:

a first adjustable height having no sliding panels stacked within the front entryway;

a second adjustable height having a first sliding panel stacked within the front entryway; and a third adjustable height having a second sliding panel stacked on top of, and abutted against, the first sliding panel within the front entryway.

* * * * *